US008727437B2

(12) United States Patent
Michalak et al.

(10) Patent No.: US 8,727,437 B2
(45) Date of Patent: May 20, 2014

(54) ACTUATOR FOR CRASH ACTIVATED HEAD RESTRAINT

(75) Inventors: Eric B. Michalak, Northville, MI (US); Gregg R. Laframboise, Windsor (CA)

(73) Assignee: Johnson Controls Technology Company, Plymouth, MI (US)

( * ) Notice: Subject to any disclaimer, the term of this patent is extended or adjusted under 35 U.S.C. 154(b) by 986 days.

(21) Appl. No.: 12/492,448

(22) Filed: Jun. 26, 2009

(65) Prior Publication Data

US 2009/0322127 A1 Dec. 31, 2009

Related U.S. Application Data

(60) Provisional application No. 61/076,203, filed on Jun. 27, 2008.

(51) Int. Cl.
*B60N 2/427* (2006.01)

(52) U.S. Cl.
USPC .................................................... 297/216.12

(58) Field of Classification Search
USPC ............................ 297/216.12, 216.1, 284.11
See application file for complete search history.

(56) References Cited

U.S. PATENT DOCUMENTS

| | | | | |
|---|---|---|---|---|
| 4,108,492 | A | 8/1978 | Kirby | |
| 6,123,380 | A | 9/2000 | Sturt et al. | |
| 6,199,951 | B1 | 3/2001 | Zeile et al. | |
| 6,749,256 | B1 * | 6/2004 | Klier et al. | 297/216.12 |
| 6,871,913 | B2 * | 3/2005 | Malsch et al. | 297/216.12 |
| 7,234,769 | B2 * | 6/2007 | Takenaka et al. | 297/216.12 |
| 7,673,938 | B2 * | 3/2010 | Yamaguchi et al. | 297/216.12 |
| 7,874,616 | B2 * | 1/2011 | D'Agostini | 297/216.12 |
| 7,950,737 | B2 * | 5/2011 | D'Agostini et al. | 297/216.12 |
| 7,992,932 | B2 * | 8/2011 | Hartlaub | 297/216.12 |
| 2004/0124686 | A1 * | 7/2004 | Malsch et al. | 297/410 |
| 2005/0275263 | A1 | 12/2005 | Norman et al. | |
| 2005/0280296 | A1 * | 12/2005 | Ohchi et al. | 297/216.12 |
| 2006/0202525 | A1 * | 9/2006 | Yamaguchi et al. | 297/216.12 |
| 2008/0012402 | A1 * | 1/2008 | Sekida | 297/216.12 |
| 2009/0121526 | A1 * | 5/2009 | Akaike et al. | 297/216.12 |
| 2010/0117420 | A1 | 5/2010 | Frotz | |

FOREIGN PATENT DOCUMENTS

| | | | |
|---|---|---|---|
| DE | 100 58 017 | A1 | 5/2002 |
| DE | 10158876 | A1 | 6/2003 |
| DE | 102006036623 | * | 10/2004 |
| DE | 10351157 | B3 | 6/2005 |
| DE | 102005028351 | A1 | 1/2007 |
| DE | 102006036121 | A1 | 2/2008 |
| EP | 0153390 | A1 | 9/1985 |

(Continued)

*Primary Examiner* — Peter Brown
(74) *Attorney, Agent, or Firm* — The Dobrusin Law Firm, PC

(57) ABSTRACT

Vehicle-seat comprising a seat base, a seatback and a head restraint reduces the gap between the head of a seat occupant and the front side of the head restraint in case of a crash, the vehicle seat further comprising an actuator, which is located in the seat back, which comprises a deformable body, which deforms reversible under the force resulting from the rearward movement of body of the seat occupant during and/or after the rear crash, and which comprises a first and a second end, whereas at least one end, preferably both ends, is/are slideably supported in a basis, whereas the head restraint and the actuator are connected by a force transmitter, which transmits a force, resulting from the deformation of the deformable body from the actuator to the head restraint.

20 Claims, 5 Drawing Sheets

(56) References Cited

FOREIGN PATENT DOCUMENTS

| | | | | |
|---|---|---|---|---|
| EP | 1 331 132 | A | | 7/2003 |
| WO | 2004/043207 | A2 | | 5/2004 |
| WO | 2004/043730 | A2 | | 5/2004 |
| WO | 2005/097545 | A2 | | 10/2005 |
| WO | WO2006037801 | | * | 4/2006 |
| WO | 2006/086320 | A | | 8/2006 |
| WO | 2010/001253 | A1 | | 1/2010 |

* cited by examiner

ACTUATOR FOR CRASH ACTIVATED HEAD RESTRAINT

CLAIM OF BENEFIT OF FILING DATE

The present application claims the benefit of the filing date of U.S. Provisional Application Ser. No. 61/076,203 (filed Jun. 27, 2008), and the entirety of the contents of this application being hereby expressly incorporated by reference.

TECHNICAL FIELD

The present disclosures relates generally to the field of vehicle seating. More specifically, this disclosure relates to a head restraint, specifically a crash-activated head restraint for use in a vehicle seat component. The present invention further relates to an actuator that activates a crash-activated head restraint to reduce the impact of a rear crash for a seat occupant.

BACKGROUND

In the following head restraint and head rest will be used interchangeably.

In order to reduce the impact of a rear-crash, more and more vehicles are provided with a crash-activated head rest, that reduces the space between the head of the seat occupant and the head rest in case of a rear crash to reduce or avoid injuries of the head, the neck and/or the back of the seat occupant. These crash activated head rests need an actuator that initiates and/or facilitates the movement of the head rest towards the head of the seat occupant. However, the actuators according to the state of the art are often complicated in design, reduce the level of comfort of the vehicle seat and/or are too slow.

SUMMARY

The present innovation overcomes the disadvantages of the prior art by providing a vehicle-seat comprising a seat base, a seatback and a head restraint located at the upper end of the seatback, said head restraint being a crash activated head restraint, which reduces the gap between the head of a seat occupant and the front side of the head restraint in case of a rear crash, the vehicle-seat further comprising an actuator, which is located in the seat back, which comprises a deformable body, which deforms reversible under the force resulting from the rearward movement of body of the seat occupant during and/or after the rear crash, and which comprises a first and a second end, whereas at least one end, preferably both ends, is/are slideably supported in a basis, whereas the head restraint and the actuator are connected by a force transmitter, which transmits a force, resulting from the deformation of the deformable body from the actuator to the head restraint.

The present invention relates to a vehicle seat. This vehicle seat can be a seat for one or numerous seat occupants, i.e. the vehicle seat according to the present invention can also be a seating bench. The seat can be located anywhere in the vehicle. The seat according to the present invention has a seat base and a seatback, which is, in most cases, but not necessarily, connected to the seat base with a recliner. A head restraint is located at the upper end of the seatback, which is preferably adjustable in its vertical position relative to the seatback. In many cases, the head restraint can also be tilted around a vertical axis in order to increase the level of comfort of the seat occupant. This head restraint is a crash activated head restraint, which reduces the gap between the head of a seat occupant and the front side of the head restraint in case of a rear crash. Furthermore, the inventive vehicle seat comprises an actuator, which is located in the seat back, preferably in the lower part of the seat back, most preferably just above the recliner. This actuator comprises a deformable body, which deforms reversible under the force resulting from the rearward movement of the body of the seat occupant during and/or after the rear crash. As soon as the crash resulting forces decay, the head restraint moves back into its initial position. The deformable body comprises a first and a second end, whereas at least one end, preferably both ends, is/are slideably supported in a basis, which is part of the actuator. The basis is attached to and/or part of the frame structure of the seat back. This basis can be, for example, a frame. The head restraint and the actuator are connected by a force transmitter, which transmits a force, resulting from the deformation of the deformable body from the actuator to the head restraint.

Preferably, the deformable body is a plate and/or plate-sections. In a preferred embodiment of the present invention, the plate is a initially bended plate which is at least partially flattened or deformed otherwise during its deformation in case of a rear crash. This plate is only deformed elastically, so that, after or during the crash, it takes back its original shape. More preferably, the plate comprises at least one horizontally orientated attenuation. This attenuation can be a recess, for example a slot and/or an indentation. This attenuation facilitates the bending of the plate and/or reduces the weight of the plate. Preferably the plate comprises several attenuation, which are aligned in parallel, more preferably horizontally and/or vertically and which are, most preferably spaced apart from each other equidistantly. Preferably, the plate comprises a stiffener, which avoids that the plate deforms in an undesired way. Preferably, this stiffener is arranged in parallel to the attenuations, and more preferably between two attenuations. Most preferably, the stiffener is located in a region of the plate, which is closest to the seat occupant.

In a preferred embodiment of the present invention, the first and/or the second end of the deformable body are supported in slots in the basis. More preferably, these slots are located to the left and to the right of the deformable body and guide the deformable body during its deformation, e.g. flattening and vice versa.

Preferably, the actuator comprises springs, which pretension the deformable body into its initial shape prior to the rear crash. The springs can be integrated into the plate or the plate sections. As soon as the crash forces decay, the springs support the back-movement of the deformable body towards its initial position.

The force transmitter can be any force transmitter known by the person skilled in the art. Preferably, the force transmitter is a Bowden cable, wherein the inner cable is preferably connected to the first end and the hollow outer cable housing is preferably connected to the second end of the deformable body.

As already mentioned above, in case of a rear crash, the head restraint moves towards the head of a seat occupant in order to reduce the gap between the front side of the head restraint and the head of the seat occupant, so that head-, neck- or back-injuries are avoided and/or minimized. In one preferred embodiment, the entire head restraint is moved towards the head of the seat occupant. In another preferred embodiment, the head restraint comprises a basis and a front side, which is located closest to the head of the seat occupant, whereas only the front side is moved in case of a rear crash, while the basis is unmoved. Preferably, this movement of the front side is a translation relative to the basis of the head restraint.

DETAILED DESCRIPTION

Figure 1:
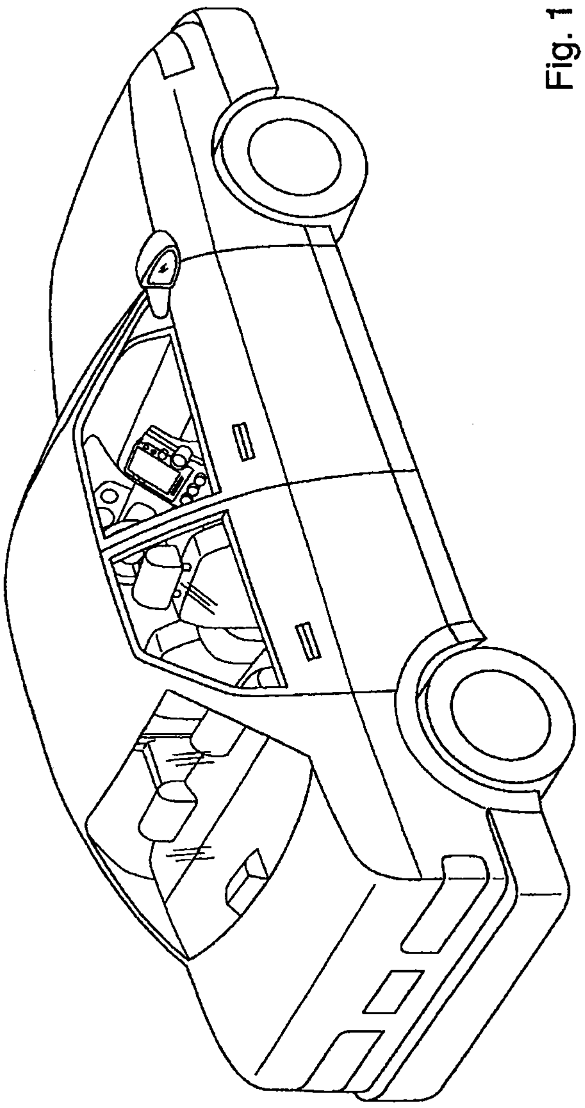
FIG. 1 is a perspective view of a vehicle having seats comprising the inventive head restraint according to an exemplary embodiment.
Figure 2:
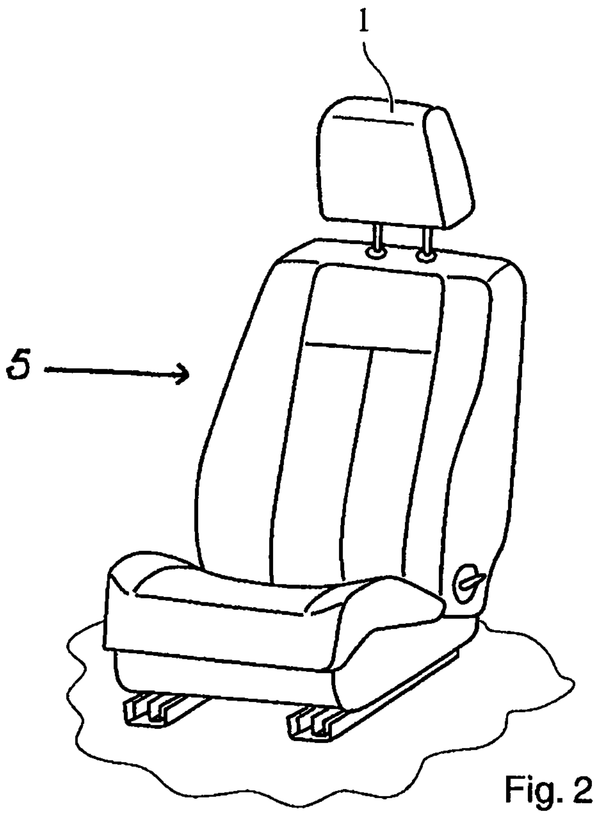
FIG. 2 is a perspective view of a vehicle seat structure having the inventive head restraint according to an exemplary embodiment.

Referring generally to the figures and in particular to FIG. 1, a vehicle is shown according to an exemplary embodiment. The vehicle includes one or more vehicle seats provided for an occupant of the vehicle. One exemplary embodiment of a vehicle seat structure is shown in FIG. 2. While the vehicle shown is a 4-door sedan, it should be understood that the seat may be used in a mini-van, sport utility vehicle or any other means in or by which someone travels or something is carried or conveyed for any market or application including everything from office seating and transportation to air planes and space travel and everything in between. The vehicle seat can be anywhere in the car, for example in the first-, second- or third row. The vehicle seat can be a bench. The vehicle seat shown includes a seat back, a seat base, and a connection member or recliner coupled to the seat back and the seat base. The vehicle seat further includes a head restraint and base portion. The headrest extends upward form the seat back and is configured to restrain the head of an occupant. The head rest can also be an integral activated head rest. The base portion (e.g. track assembly) couples the seat to the vehicle body and may be configured to allow the seat to be selectively positioned (manually or motor driven) relative to the vehicle body.

Figure 3:
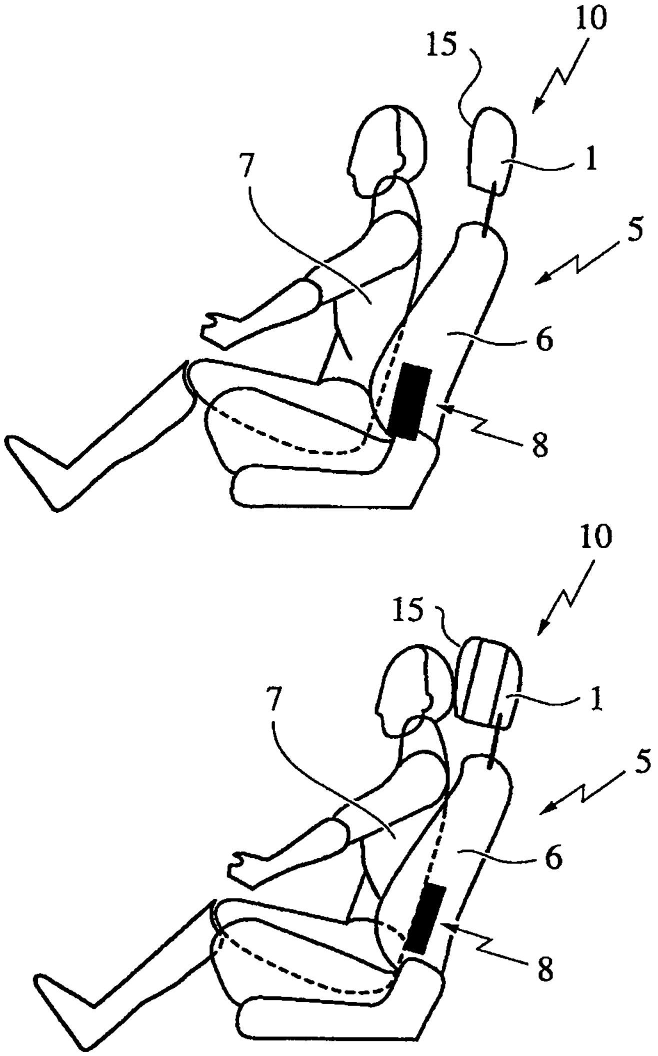
FIG. 3 shows a schematic of the actuator before the crash (upper drawing) and during the crash (lower drawing) according to an exemplary embodiment.

FIG. 3 shows a schematic of the actuator before the crash (upper drawing) and during the crash (lower drawing) according to an exemplary embodiment. The vehicle seat 5 comprises a back rest 6 in which an actuator is arranged. The actuator is located in the lower part of the back rest, preferably just above the recliner and/or in the vicinity where the rump of the seat occupant is in touch with the seat back. Connected to the structure 16 of the back rest 6 is a head restraint 1. In seat 5 is occupied by a person 7. The upper drawing shows the position 10 of the person 7 relative to the seat 5 and the head restraint 1 before the crash. Especially the distance between the front end of the head restraint 15 and the head of the seat occupant is relatively large. The crash situation is now explained according to the lower drawing. Due to the rear crash, the seat occupant 7 is pressed into the seat 5. This force causes the change in shape of the actuator 8, which is in the present example flattened and/or otherwise deformed. This change in shape is transferred by means of, for example a Bowden cable (not depicted), to the head restraint 1, which causes the front end 15 of the head restraint 1 to move towards the head of the seat occupant to reduce the gap between the head and the front end of the head restraint. In the present example the headrest is designed according to WO 2005/097545 A2 which is incorporated herewith by reference and is thus part of the present disclosure; i.e. only the front side of the headrest moves towards the head of the occupant. This movement is a pure translation. However, the person skilled in the art understands that it is also possible to move the entire head restraint towards the head of the occupant. After the crash, the head restraint and/or part of it preferably moves back to its initial position.

Figure 4:
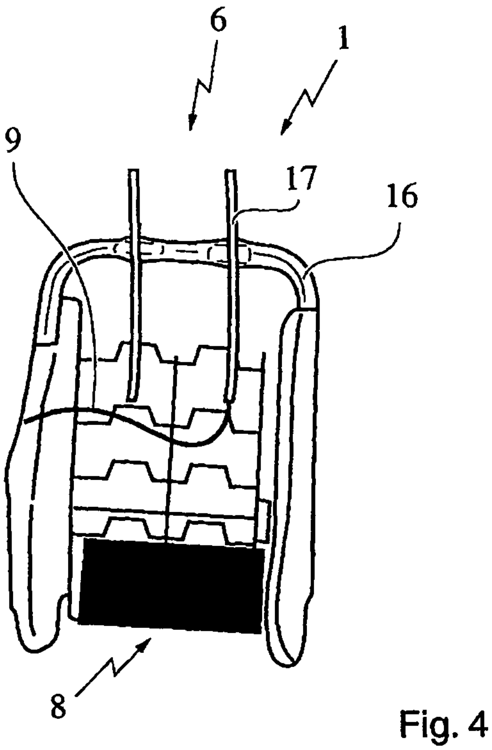
FIG. 4 shows how the actuator is arranged in the backrest of the vehicle seat according to an exemplary embodiment.

FIG. 4 shows schematically that the actuator is arranged in the lower part of the backrest of the vehicle seat according to an exemplary embodiment. Furthermore, FIG. 4 shows that the supports 17 of the head restraint 1 is fixed to, structure 16 of the back rest 6 of the vehicle seat. The Bowden cable 9 is guided via the support 17, here a tube from the actuator 8 to the head restraint 1.

Figures 5, 5A, 5B, 5C, 6:
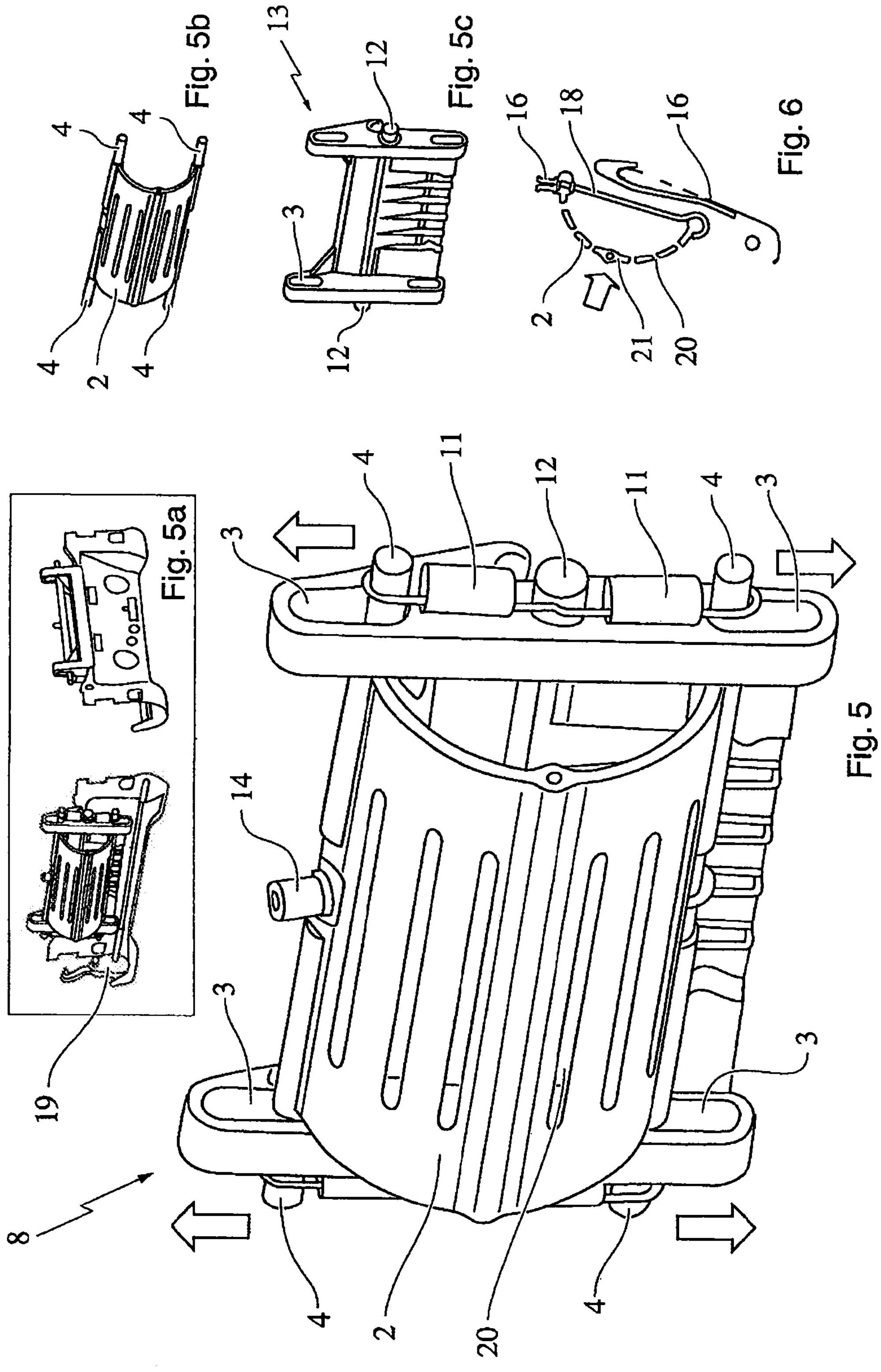
FIGS. 5-5*c* show one exemplary embodiment of the innovative actuator.
FIG. 6 shows another exemplary embodiment of the innovative actuator.

FIGS. 5-5*c* show one exemplary embodiment of the innovative actuator. As can be seen from FIG. 1, the deformable body 2 of the actuator 8 is in the present example a bended plate, which is arranged in a basis 13 by means of pins 4 which slide in slots 3 of the basis 13, respectively. In case of a rear crash, the bended plate is flattened; i.e. the pins 4 on each-side of the plate 2 move apart, respectively. The movement of pins .4 under crash load is depicted by the arrows. Each pin 4 and the in 12 at the basis 13 are connected with a spring, which elongates when the plate is flattened and which force the plate into its initial position after, the crash. Reference number 14 refers to the fixation of the jacket of a Bowden cable. The core of the Bowden cable is fixed to the lower part of plate 2. The person skilled in the art understands that these connections can be interchanged. FIG. 5*a* shows how the actuator according to FIG. 5 is incorporated into the seat back. It is located generally above the recliner 19. FIG. 5*b* shows the plate 2 and FIG. 5*c* the basis of the actuator. As can be seen from FIGS. 5 and 6, the plate can comprises attenuations 20, here slots, which are arranged horizontally and in parallel. The slots 20 do not extend over the entire width of the plate. Additionally, the plate can comprise in its region, which is closest to the seat occupant a stiffener 21, which prevents the plate from deforming in an undesired way, e.g. buckles under the rearward force.

FIG. 6 shows is a section cut of the actuator according to FIG. 5. The actuator comprises a bended plate. The upper end is connected to the housing of the Bowden cable, while the lower end of the plate is connected to the lower end of the cable. The plate is also flattened during a rear crash by the body of the seat occupant.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The term "consisting essentially of" (or a derivation thereof) to describe a combination shall include the elements, components or steps identified, and such other elements, components or steps that do not materially affect the basic and novel characteristics of the combination. The use of the terms “comprising” or “including” (or derivations thereof) to describe combinations of elements, components or steps herein also contemplates embodiments that consist essentially of (or even consist of) the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The teachings herein also contemplate methods of using the structures as described, as well as methods that include operational steps performed by the structures herein. Though the use of a single element, component or step is contemplated by the teachings, the disclosure of “a” or “one” to describe an element, component or step is not intended to foreclose additional elements, ingredients, components or steps.

LIST OF REFERENCE SIGNS

1 head restraint
2 deformable body, bended plate
3 slot
4 pin
5 vehicle seat
6 seatback, back rest
7 seat occupant
8 actuator
9 force transmitter, Bowden cable
10 location of the head restraint
11 spring
12 pin
13 basis
14 connection for the jacket of the Bowden cable
15 front side of the head restraint
16 structure of the back rest
17 support of the head restraint
18 cable
19 recliner
20 attenuation, slot
21 stiffener

The invention claimed is:

1. Vehicle-seat comprising a seat base, a seatback and a head restraint located at the upper end of the seatback, said head restraint being a crash activated head restraint, which reduces the gap between the head of a seat occupant and the front side of the head restraint in case of a rear crash, the vehicle seat further comprising an actuator, which is located in the seat back, which comprises a deformable body, which deforms elastically and reversibly under the force resulting from the rearward movement of a body of the seat occupant during and/or after the rear crash, and which comprises a first and a second end, wherein at least one end, is slideably supported in a basis, wherein the head restraint and the actuator are connected by a force transmitter, which transmits a force, resulting from the deformation of the deformable body from the actuator to the head restraint, wherein the deformable body is a plate, wherein plate has an initial shape that is generally convex from the first end to the second end, and wherein the plate is an elastically bended plate which is flattened during deformation and returns to the initial shape during or after the rear crash.

2. Vehicle-seat according to claim 1, wherein the first and the second end of the deformable body are supported in slots in the basis.

3. Vehicle-seat according to claim 1, wherein the actuator comprises springs, which pretension the deformable body into its initial shape prior to the rear crash.

4. Vehicle-seat according to claim 1, wherein the first and the second ends of the deformable body are slideably supported in the basis.

5. Vehicle-seat according to claim 4, wherein the plate comprises at least one horizontally orientated attenuation.

6. Vehicle-seat according to claim 4, wherein the plate comprises a stiffener.

7. Vehicle-seat according to claim 4, wherein the first and the second end of the deformable body are supported in slots in the basis.

8. Vehicle-seat according to claim 4, wherein the actuator comprises springs, which pretension the deformable body into its initial shape prior to the rear crash.

9. Vehicle-seat according to claim 4, wherein the force transmitter is a Bowden cable.

10. Vehicle-seat according to claim 9, wherein an inner cable is connected to the first end and a hollow outer cable housing is connected to the second end.

11. Vehicle-seat according to claim 4, wherein the entire head restraint is moved in case of a rear crash.

12. Vehicle-seat according to claim 4, wherein the head restraint comprise: a support and a front side and wherein only the front side is moved in case of a rear crash.

13. Vehicle-seat according to claim 12, wherein the movement of the front side is a translation.

14. Vehicle-seat comprising:

a) a seat base;

b) a seat back; and c) a head restraint located at the upper end of the seat back, said head restraint being a crash activated head restraint, which reduces the gap between the head of a seat occupant and the front side of the head restraint in case of a rear crash;

the vehicle seat further comprising:

an actuator, which is located in the seat back, which comprises a deformable body and one or more springs secured to at least one end of the deformable body, wherein the deformable body deforms elastically and reversibly under a force resulting from a rearward movement of a body of the seat occupant during and/or after the rear crash, and which comprises a first and a second end, wherein at least one end is slideably supported in a basis, wherein the head restraint and the actuator are connected by a force transmitter, which transmits a force, resulting from the deformation of the deformable body from the actuator to the head restraint, wherein the deformable body is a plate, and wherein the plate is a bended plate which is flattened during deformation.

15. Vehicle-seat according to claim 14, wherein the first and the second ends of the deformable body are slideably supported in the basis.

16. Vehicle-seat according to claim 15, wherein the one or more springs are separate tension springs secured to the first end of the deformable body and the second end of the deformable body.

17. Vehicle-seat according to claim 15, wherein the plate comprises least one horizontally orientated attenuation.

18. Vehicle-seat according to claim 15, wherein the plate comprises a stiffener.

19. Vehicle-seat according to claim 15, wherein the force transmitter is a Bowden cable.

20. Vehicle-seat according to claim 14, wherein the one or more springs pretension the deformable body into its initial shape prior to the rear crash.

* * * * *

UNITED STATES PATENT AND TRADEMARK OFFICE

CERTIFICATE OF CORRECTION

PATENT NO. : 8,727,437 B2
APPLICATION NO. : 12/492448
DATED : May 20, 2014
INVENTOR(S) : Michalak et al.

It is certified that error appears in the above-identified patent and that said Letters Patent is hereby corrected as shown below:

In the Claims:

Column 5, Line 52, delete "," between "at least one end" and "is slideably"

Column 5, Line 57, insert --the-- after "is a plate, wherein"

Signed and Sealed this
Ninth Day of September, 2014

Michelle K. Lee
*Deputy Director of the United States Patent and Trademark Office*